United States Patent
Gondo et al.

(10) Patent No.: US 8,699,520 B2
(45) Date of Patent: Apr. 15, 2014

(54) COMPUTER DEVICE, RECEIVING DEVICE, RECEIVING METHOD, AND COMPUTER READABLE STORAGE MEDIUM STORING INSTRUCTIONS OF A COMPUTER PROGRAM THEREOF

(75) Inventors: Shunichi Gondo, Tokyo (JP); Masashi Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 729 days.

(21) Appl. No.: 12/880,893

(22) Filed: Sep. 13, 2010

(65) Prior Publication Data

US 2011/0243155 A1  Oct. 6, 2011

(30) Foreign Application Priority Data

Mar. 30, 2010 (JP) ................ P2010-079818

(51) Int. Cl.
*H04J 3/24* (2006.01)
*H03M 13/00* (2006.01)
*G06F 13/00* (2006.01)

(52) U.S. Cl.
USPC ............................ 370/474; 714/776; 711/173

(58) Field of Classification Search
USPC ................... 370/474, 395; 714/776; 711/173
See application file for complete search history.

(56) References Cited

U.S. PATENT DOCUMENTS

| | | | |
|---|---|---|---|
| 2007/0033494 A1* | 2/2007 | Wenger et al. ............. | 714/776 |
| 2007/0033609 A1 | 2/2007 | Dei | |
| 2007/0300134 A1* | 12/2007 | Sugai et al. ................ | 714/776 |
| 2009/0089535 A1* | 4/2009 | Lohmar et al. ............. | 711/173 |

FOREIGN PATENT DOCUMENTS

| | | |
|---|---|---|
| JP | 2008-131153 | 6/2008 |
| JP | 2009-60513 | 3/2009 |
| WO | WO 2005/027439 A1 | 3/2005 |

OTHER PUBLICATIONS

Notification of Reasons for Refusal issued by the Japanese Patent Office on Oct. 12, 2012, for Japanese Patent Application No. 2010-079818, and English-language translation thereof.
Notification of Reasons for Refusal issued by the Japanese Patent Office on Jan. 20, 2012, for Japanese Patent Application No. 2010-079818, and English-language translation thereof.
Tsuji et al., "A Study on Operation Controllable Forward Error Correction Module," IEICE (2010), pp. 51.

* cited by examiner

*Primary Examiner* — Ian N Moore
*Assistant Examiner* — Kiet Tang
(74) *Attorney, Agent, or Firm* — Finnegan, Henderson, Farabow, Garrett & Dunner, L.L.P.

(57) ABSTRACT

A computer device includes a data packet buffer, an improving quality packet buffer, a correspondence memory, an improving quality processing unit, an operation controller, and a recovered data packet processing unit. The data packet buffer stores data packets of streams. The improving quality packet buffer stores an improving quality packet including a redundant data and identification information. The correspondence memory stores a correspondence between the improving quality packet and the data packets. The improving quality processing unit performs an improving quality processing for recovering the lost data packet by using the redundant data and at least one of the data packets corresponding to the correspondence, in order to obtain a recovered data packet. The operation controller controls the improving quality processing unit to perform the improving quality processing. The recovered data packet processing unit stores the recovered data packet into the data packet buffer.

10 Claims, 12 Drawing Sheets

COMPUTER DEVICE, RECEIVING DEVICE, RECEIVING METHOD, AND COMPUTER READABLE STORAGE MEDIUM STORING INSTRUCTIONS OF A COMPUTER PROGRAM THEREOF

CROSS-REFERENCE TO RELATED APPLICATION

This application is based upon and claims the benefit of priority from Japanese Patent Application No. 2010-079818, filed on Mar. 30, 2010, the entire contents of which are incorporated herein by reference.

FIELD

Embodiments described herein relate generally to a computer device, a receiving device, a receiving method, and computer readable storage medium storing instructions of a computer program thereof.

BACKGROUND

In a real time streaming transport such as IP broadcast, WO2005/027439 A1 (KOKAI) discloses a method for increasing or decreasing the number of streams to play according to a selection or an instruction by a user. In this reference, in order to reduce a delay time since a stream is switched due to a channel selection until a new stream starts to be played, plurality of the streams are received at one time in advance. Then, a stream which is actually played is selected and displayed from among the received streams.

The real time streaming transport of a video or a sound sometimes uses RTP (Real-time Transport Protocol). The RTP is effective to correct a wrong order in a data sequence or to reduce fluctuations of transmission intervals (such processing is called RTP processing). Moreover, a lost data can be detected by the RTP. However, it is difficult to recover the lost data by the RTP. In order to recover the lost data, for example, two methods exist. One method is retransmission of the lost data, and another method is correcting error of the lost data by using an error correction code. The method using retransmission of the lost data is not appropriate to the real time streaming transport, in view of time constraints, the uncertainty of retransmission, and the difficulty in retransmission request. On the other hand, in the method using error correction code, FEC (Forward Error Correction) is popular as an error correction code. In a case of using FEC, a transmitting node divides data to be transmitted (referred to as "original data") into groups, generates redundant data for each of the groups by performing calculation based on a predetermined method, and transmits the original data and the redundant data in parallel to each other with the redundant data stored in an FEC packet. If at least one original data is lost in each of the groups, a receiving node can recover the lost original data based on the original data which are received correctly and the redundant data. Such processing is called FEC processing. In this case, since the redundant data and the original data are transmitted together almost without any delay, the receiving node can recover the lost data immediately. Thus, the delay due to the method using FEC is smaller than that due to the method using retransmission of the lost data.

However, in a case where the plurality of the streams is received at one time in advance, the FEC processing may be performed for all the plurality of streams. In this case, the FEC processing is wasted for stream which is not selected to play.

To avoid this, a method that the FEC processing is not performed for stream which is not expected to play, is considered. However, if the stream is selected to play, the stream may play with low quality because the stream is not subjected the FEC processing. On the other hand, if the FEC processing is performed after the stream is selected to play, the delay time needed for the FEC processing cannot be reduced.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention.

DETAILED DESCRIPTION

Figure 1:
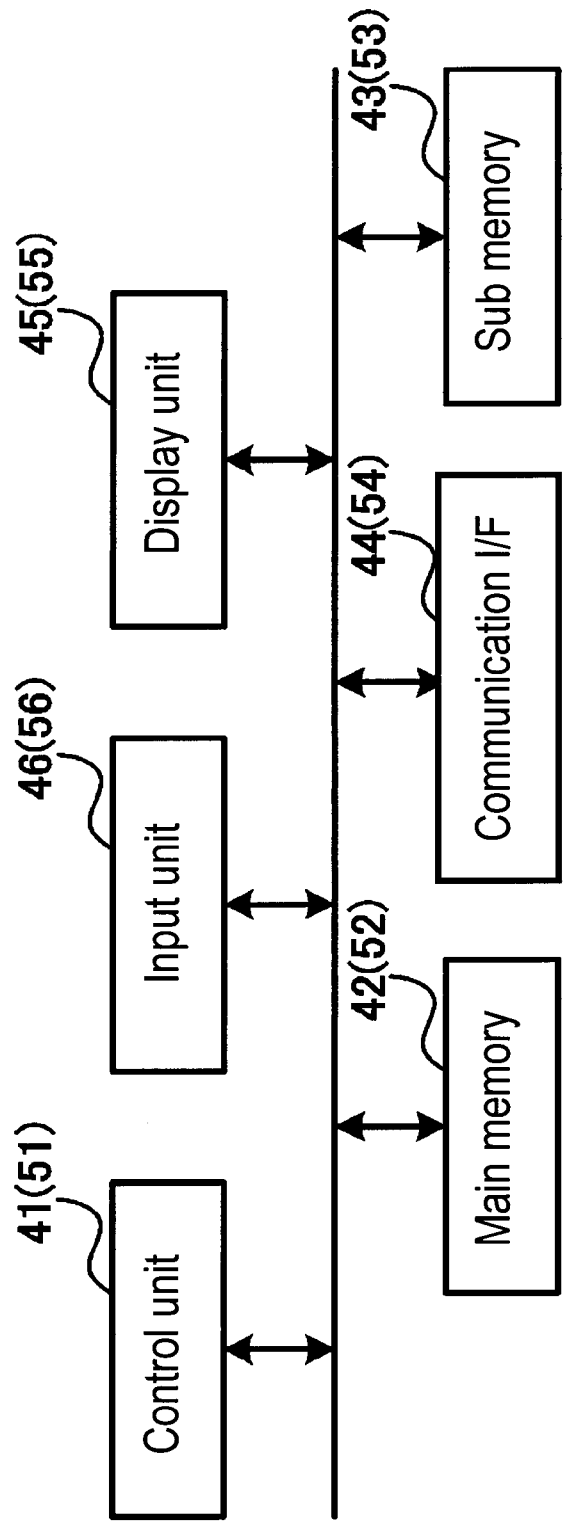
FIG. 1 is a block diagram illustrating a hardware configuration of a computer (receiving processing) device according to a first embodiment.

According to one aspect of the invention, a computer device includes a data packet buffer to store data packets of streams; an improving quality packet buffer to store an improving quality packet including a redundant data to recover a lost data packet and an identification information to identify a plurality of identified data packets being used for generating the redundant data; a correspondence memory to store a correspondence between the improving quality packet and the data packets in the data packet buffer, the data packets being the identified data packets identified by the identification information; an improving quality processing unit configured to perform an improving quality processing for recovering the lost data packet by using the redundant data in the improving quality packet and at least one of the data packets in the data packet buffer corresponding to the correspondence, in order to obtain a recovered data packet; an operation controller to control the improving quality processing unit to perform the improving quality processing with the improving quality packet and at least one of the data packets in the data packet buffer; and a recovered data packet processing unit configured to store the recovered data packet into the data packet buffer.

According to another aspect of the invention, a receiving device includes a data packet receiver unit to receive data packets of streams at one time; a data packet buffer to store the data packets; an improving quality packet receiver unit to receive an improving quality packet including a redundant data to recover a lost data packet and an identification information to identify a plurality of identified data packets being used for generating the redundant data; an improving quality packet buffer to store the improving quality packet; a disturbance solving processing unit to solve a disturbance of the data packets; a correspondence memory to store a correspondence between the improving quality packet and the data packets in the data packet buffer, the data packets being the identified data packets identified by the identification information; an improving quality processing unit to configured perform an improving quality processing for recovering the lost data packet by using the redundant data in the improving quality packet and at least one of the data packets in the data packet buffer corresponding to the correspondence, in order to obtain a recovered data packet; an operation controller to control the improving quality processing unit to perform the improving quality processing with the improving quality packet and at least one of the data packets in the data packet buffer; and a recovered data packet processing unit configured to store the recovered data packet into the data packet buffer.

According to another aspect of the invention, a receiving method includes receiving data packets of streams at one time by a data packet receiver unit; storing the data packets into a data packet buffer; receiving an improving quality packet by an improving quality packet receiver unit, the improving quality packet including a redundant data to recover a lost data packet and an identification information to identify a plurality of identified data packets being used for generating the redundant data; storing the improving quality packet into an improving quality packet buffer; storing a correspondence between the improving quality packet and the data packets in the data packet buffer into a correspondence memory, the data packets being the identified data packets identified by the identification information; performing improving quality processing by an improving quality processing unit for recovering the lost data packet by using the redundant data in the improving quality packet and at least one of the data packets in the data packet buffer corresponding to the correspondence, in order to obtain a recovered data packet; controlling the improving quality processing unit to perform the improving quality processing with the improving quality packet and at least one of the data packets in the data packet buffer by the operation controller; and storing the recovered data packet into the data packet buffer by the recovered data packet processing unit.

According to another aspect of the invention, a computer readable storage medium storing instructions of a receiving processing program executable by a computer, the program which when executed by a computer results in performance of steps includes a program module for instructing a computer to receive data packets of streams at one time by a data packet receiver unit; a program module for instructing a computer to store the data packets into a data packet buffer; a program module for instructing a computer to receive an improving quality packet by an improving quality packet receiver unit, the improving quality packet including a redundant data to recover a lost data packet and an identification information to identify a plurality of identified data packets being used for generating the redundant data; a program module for instructing a computer to store the improving quality packet into an improving quality packet buffer; a program module for instructing a computer to store a correspondence between the improving quality packet and the data packets in the data packet buffer into a correspondence memory, the data packets being the identified data packets identified by the identification information; a program module for instructing a computer to perform improving quality processing by an improving quality processing unit for recovering the lost data packet by using the redundant data in the improving quality packet and at least one of the data packets in the data packet buffer corresponding to the correspondence, in order to obtain a recovered data packet; a program module for instructing a computer to control the improving quality processing unit to perform the improving quality processing with the improving quality packet and at least one of the data packets in the data packet buffer by the operation controller; and a program module for instructing a computer to store the recovered data packet into the data packet buffer by the recovered data packet processing unit.

Figure 2A:
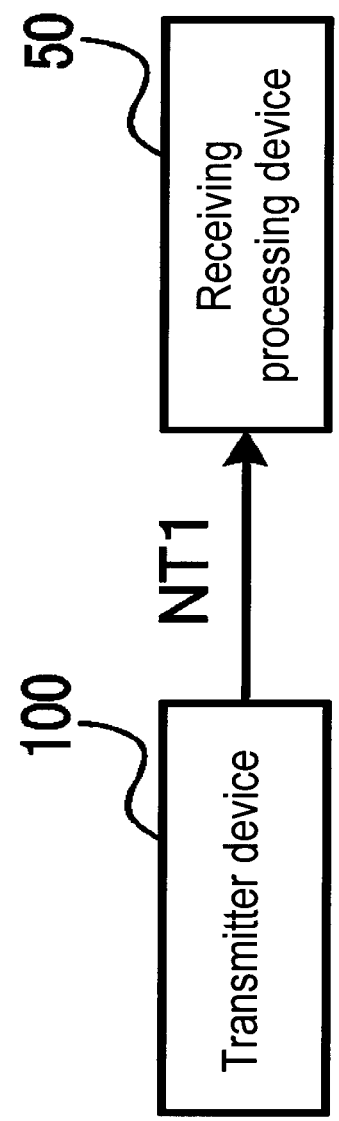
FIG. 2A is a diagram showing an example of transmitting and receiving.

Hereinafter, embodiments of the invention will be described with reference to the drawings. Embodiments of a computer device 40 and a receiving processing device 50 according to the invention will be described in detail. First, a hardware configuration of the computer device 40 (receiving processing device 50) will be explained by using FIG. 1. The computer device 40 (50) includes a control unit 41 (51) such as a CPU (Central Processing Unit) to control the entire device, a main memory 42 (52) such as a ROM (Read Only Memory) or a RAM (Random Access Memory) to store various kinds of data and programs therein, a sub memory 43 (53) such as a HDD (Hard Disk Drive) or CD (Compact Disk) drive device to store various kinds of data and programs therein, a communication I/F (interface) 44 (54) to control communications with an external device, and a bus to connect these components to each other. The computer device 40 (50) has a hardware configuration employing an ordinary computer. In addition, a display unit 45 (55) to display information and an input unit 46 (56) such as a keyboard and a mouse to receive an instruction from a user are connected to the computer device 40 (50) through wired or wireless medium. As shown in FIG. 2A, the computer device (40) 50 receives FEC packets that are supporting quality and RTP packets that are including data packets through the communication I/F 44 (54) and a network NT 1 from a transmitter device 100 that is an external device. The network NT1 is, for example, a LAN (Local Area Network), an intranet, Ethernet (registered trademark) or the Internet. The RTP packets and the FEC packets are packets transmitted according to the RTP described above, for example.

Figure 3:
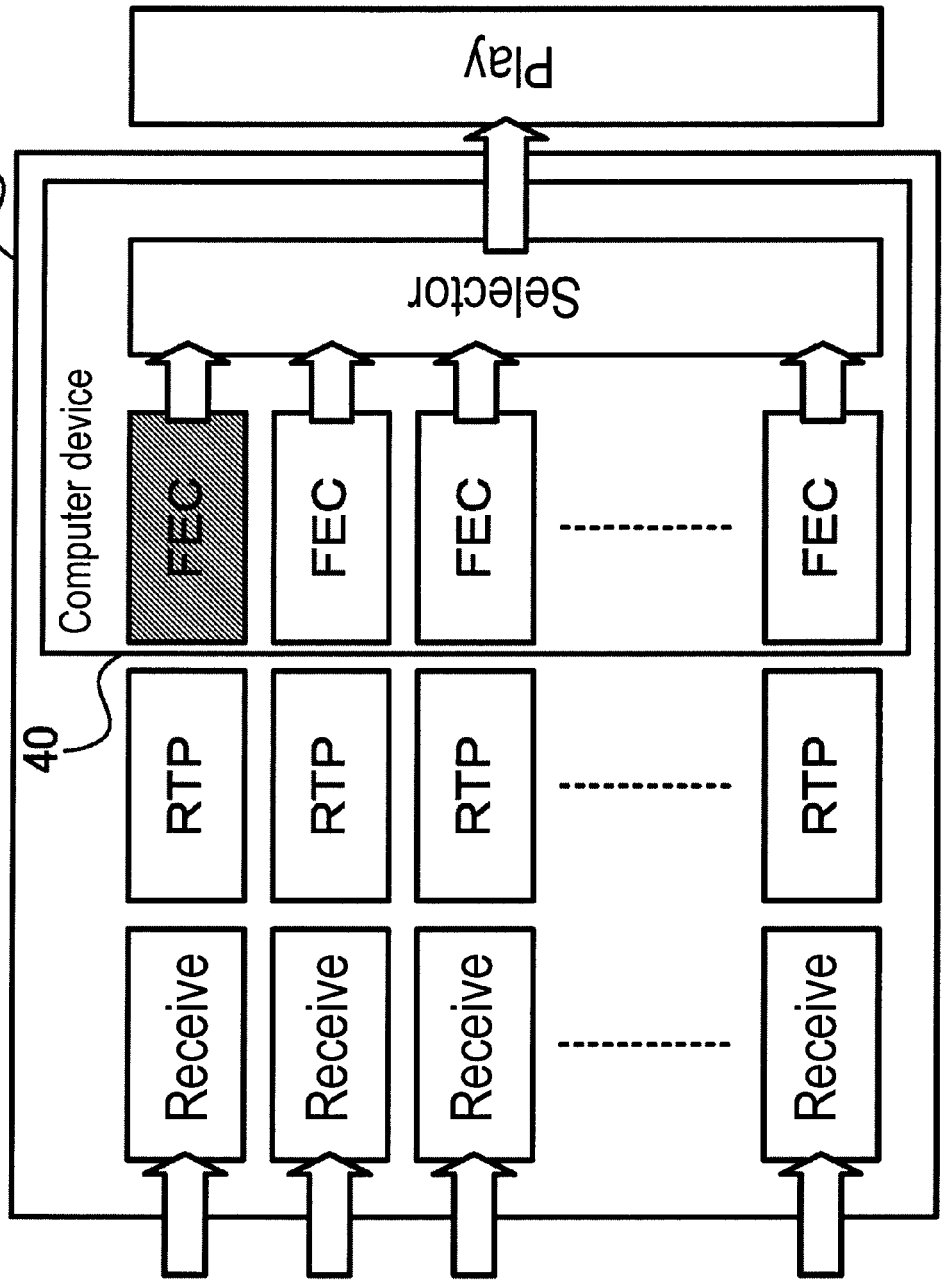
FIG. 3 is a diagram explaining process of a receiving processing device.

FIG. 3 shows a processing structure since receiving the plurality of the streams until play them at the receiving processing device 50 (including computer device 40). When a user indicates a stream by making channel selection from the plurality of the streams, a selector selects the indicated stream according to the indication sent through the communication I/F 54 (44). In FIG. 3, a hatched FEC indicates the FEC processing performed for the selected stream.

Next, each of functions of the computer device 40 (50) will be described. The control unit 41 (51) realizes the functions by executing programs stored in the main memory 42 (52) and the sub memory 43 (53).

(Description of the First Embodiment)

Figure 4:
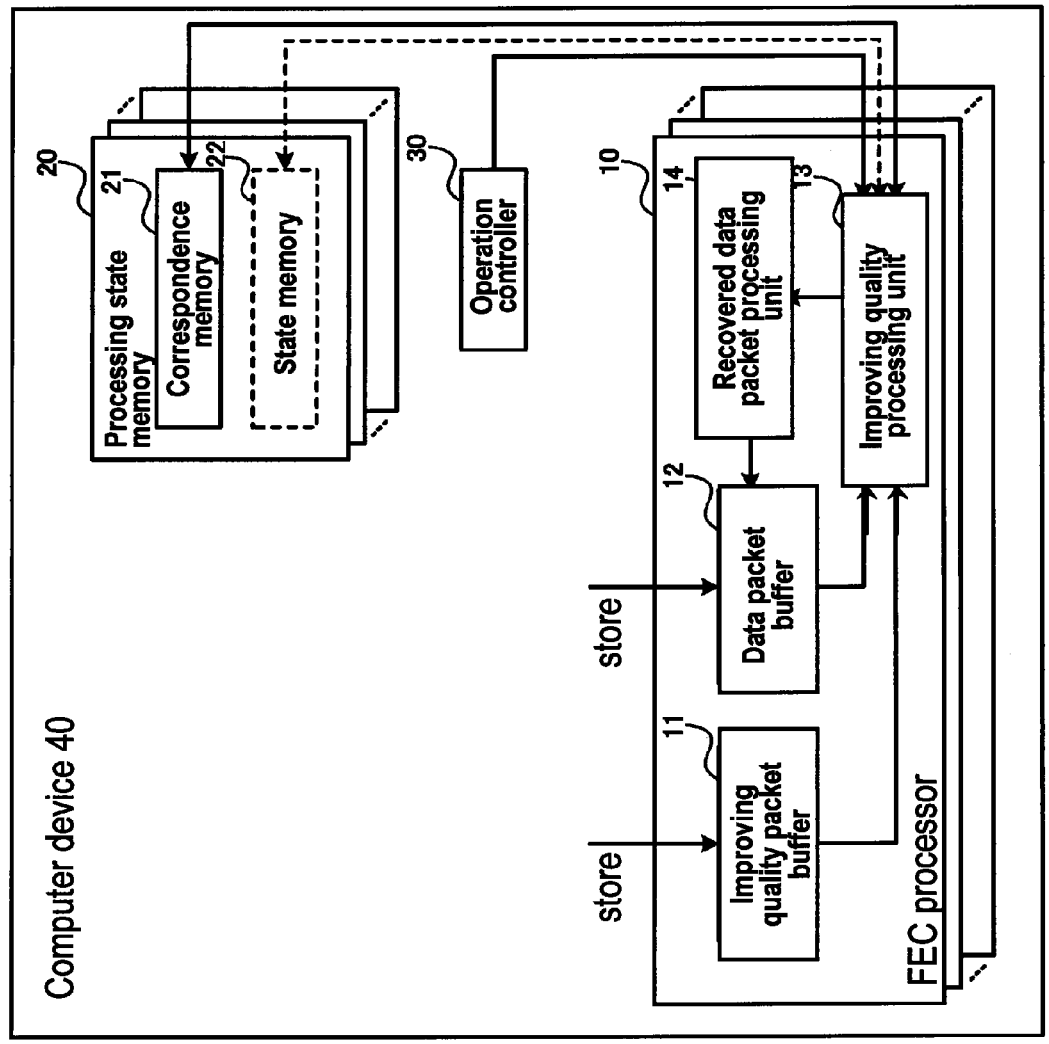
FIG. 4 is a block diagram illustrating a functional configuration of the computer device.

FIG. 4 is a diagram illustrating a functional configuration of the computer device 40. The control unit 41 includes an FEC processor 10 and an operation controller 30. A function of a processing state memory 20 is implemented by the main memory 42. Functions of the FEC processor 10 and the operation controller 30 are implemented through execution of the programs by the control unit 41.

The FEC processor 10 includes a FEC packet buffer (improving quality packet buffer) 11, a RTP packet buffer (data packet buffer) 12, an improving quality unit 13, and a recovered data packet processing unit 14. The processing state memory 20 includes a correspondence memory 21 and a state memory 22. In response to an instruction from the improving quality unit 13 to be described later, the correspondence memory 21 stores a correspondence between a FEC packet stored in the FEC packet buffer 11 and an RTP packet (data packet) which is stored in the RTP packet buffer 12 and associated with the FEC packet. Also, in response to an instruction from the improving quality unit 13, the state memory 22 stores at least one of a middle result and a final result for each session of the FEC processing. In the FEC processing, an XOR operation is performed as a predetermined operation by the improving quality unit 13. The FEC processing and the processing state will be described in detail later.

The FEC packet buffer 11 buffers (stores) improving quality packets (FEC packets). The FEC packets each include a sequence number indicating number in the data sequence is assigned to the FEC packet, redundant data to recover a lost data packet, and RTP packet identification information to identify the RTP packets (data packet) used to generate the redundant data. The redundant data is data generated by the transmitter device 100 through an XOR (exclusive logical OR) operation, as a predetermined operation, using multiple RTP packets associated with the FEC packet in advance. The RTP packet identification information may be, for example, sequence numbers assigned to the RTP packets, or calculated values resulting from an operation performed in advance in a predetermined way (re-configurable way) using the sequence numbers. The correspondences between the RTP packets and the FEC packet are specified according to the RTP packet identification information. The RTP packet buffer 12 buffers (stores) the RTP packets. The RTP packets each include, for example, media data representing a video and sound, a sequence number, a timestamp.

The improving quality unit 13 performs the FEC processing to recover a lost RTP packet by using an FEC packet buffered in the FEC packet buffer 11 and RTP packets corresponding to the FEC packet and being buffered in the RTP packet buffer 12. For example, the improving quality unit 13 calculates the XOR of the redundant data included in the FEC packet and one of the RTP packets corresponding to the FEC packet. As a result, the improving quality unit 13 obtains a middle result. Then, the improving quality unit 13 calculates the XOR of the middle result and another one of the RTP packets corresponding to the FEC packet to obtain a middle result. When there are three or more RTP packets corresponding to a single FEC packet, the improving quality unit 13 repeats the operation of calculating the XOR of the immediately preceding middle result and another one of the RTP packets yet to be used in the operation. Thus, the improving quality unit 13 calculates the XOR for each of the RTP packets corresponding to an FEC packet to obtain the middle result. When one of the RTP packets corresponding to the FEC packet is lost, the improving quality unit 13 obtains the lost RTP packet as a final result. In other words, the lost RTP packet is recovered. On the other hand, when no RTP packet corresponding to the FEC packet is lost, the improving quality unit 13 can invalidate the final result.

In addition, in the first embodiment, the improving quality unit 13 detects whether or not a new FEC packet is buffered in the FEC packet buffer 11. The improving quality unit 13 also detects whether or not a new RTP packet is buffered in the RTP packet buffer 12. Then, the improving quality unit 13 instructs the correspondence memory 21 to store the correspondence between the FEC packet buffered in the FEC packet buffer 11 and the RTP packet buffered in the RTP packet buffer 12 from among the RTP packets corresponding to the FEC packet. Note that, the RTP packets corresponding to the FEC packet can be identified by using the RTP packet identification information. For example, the sequence number of the FEC packet and the sequence number of the RTP packet corresponding to the FEC packet may be expressed in the form of matrix, or may be liked with each other in the form of graph.

The improving quality unit 13 refers to the correspondences stored in the correspondence memory 21 when starting the FEC processing. Then, the improving quality unit 13 performs the FEC processing by using the FEC packet targeted for the processing, and the RTP packet yet to be used by the FEC processor 10 in the above mentioned XOR operation for the FEC packet from among the RTP packets corresponding to the FEC packet and being buffered in the RTP packet buffer 12. Upon completion of the XOR operation using the RTP packet, the improving quality unit 13 instructs the state memory 22 to store the sequence number of the FEC packet targeted for the processing, the sequence number assigned to the RTP packet used in the XOR operation, and a processing state indicating the operation result. In addition, upon completion of the FEC processing in which any one of the RTP packets corresponding to the FEC packet is found lost, the improving quality unit 13 obtains the RTP packet that is the final operation result. Then, the improving quality unit 13 outputs the data packet to the recovered data packet processing unit 14. Subsequently, the improving quality unit 13 deletes the processing state of the FEC processing for the FEC packet from the state memory 22. At last, the improving quality unit 13 terminates the FEC processing. On the other hand, upon completion of the FEC processing in which none of the RTP packets corresponding to the FEC packet is found lost, the improving quality unit 13 invalidates the processing state of the FEC processing for the FEC packet by deleting the processing state from the state memory 22. Then, the improving quality unit 13 terminates the FEC processing.

The recovered data packet processing unit 14 instructs the RTP packet buffer 12 to buffer the RTP packet recovered by the improving quality unit 13. For example, the recovered data packet processing unit 14 instructs the RTP packet buffer 12 to buffer the RTP packet by inserting the RTP packet so that the foregoing sequence numbers can be arranged in the ascending order in the RTP packet buffer 12. Note that, the RTP packets buffered in the RTP packet buffer 12 are sequentially sent to an application program, and a function of the application program performs playing using the RTP packets.

The operation controller 30 controls the FEC processing to be performed only for packets instructed by a user according to the correspondences stored in the correspondence memory 21. For example, the operation controller 30 may instruct the improving quality unit 13 to perform the FEC processing only for packets of a stream which is indicated by a user to be played from among the plurality of the streams. Moreover, when a stream being played is switched to another stream, the operation controller 30 may control the improving quality unit 13 to halt the FEC processing for the stream being played. Then, the operation controller 30 may control the improving quality unit 13 to start the FEC processing for the switched stream.

Figure 5:
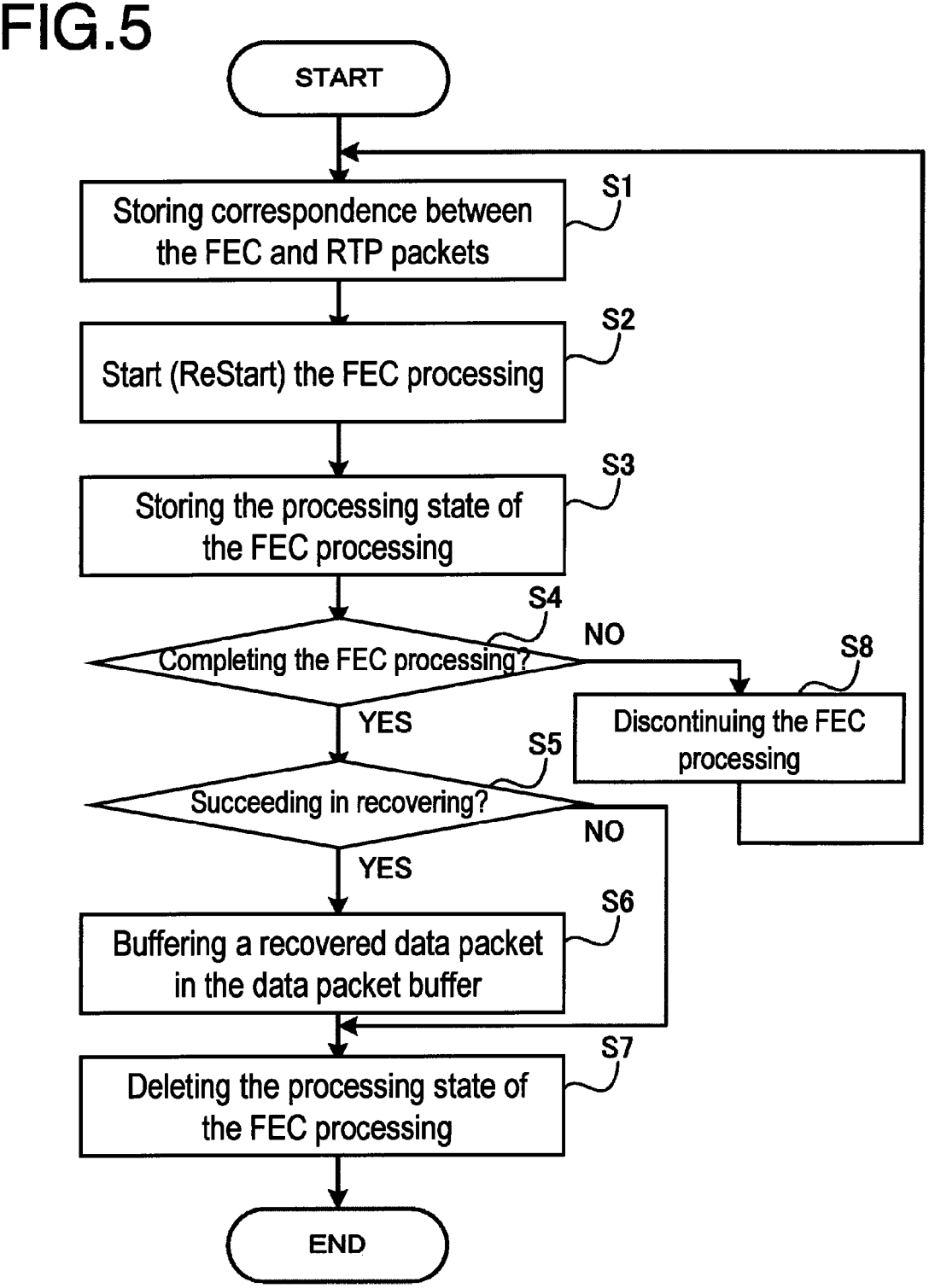
FIG. 5 is a flow chart explaining operation of the computer device.

Next, a procedure of reception processing performed by the computer device 40 will be described with reference to FIG. 5. The improving quality unit 13 of the computer device 40 detects whether or not a new FEC packet is buffered in the FEC packet buffer 11. The improving quality unit 13 also detects whether or not a new RTP packet is buffered in the RTP packet buffer 12. Then, the improving quality unit 13 instructs the correspondence memory 21 to store the correspondence between the FEC packet buffered in the FEC packet buffer 11 and the RTP packet buffered in the RTP packet buffer 12 from among the RTP packets corresponding to the FEC packet (in the step S1).

The computer device 40 refers to the correspondences stored in the correspondence memory 21 in the step S1, and causes the improving quality unit 13 to start the FEC processing by using the FEC packet and RTP packets targeted by an instruction given by the operation controller 30 (in the step S2). In the FEC processing, the computer device 40 calculates the XOR of the FEC packet and one of the RTP packets corresponding to the FEC packet, and then repeats the operation of calculating the XOR of the immediately preceding operation result and another one of the RTP packets yet to be used in the operation. Upon completion of all the XOR operations using all the targeted RTP packets, the computer device 40 causes the state memory 22 to store the processing state of the FEC processing (in the step S3). Then, if the final operation result is obtained as the processing state after completion of the FEC processing ("YES" of the step S4) and if a lost packet is obtained as the processing state ("YES" of the step S5), the computer device 40 buffers the obtained packet in the RTP packet buffer 12 by using the function of the recovered data packet processing unit 14 (in the step S6). As a result, the recovered RTP packet is buffered in the RTP packet buffer 12. In addition, the computer device 40 deletes the processing state from the state memory 22 and terminates the FEC processing by using the function of the improving quality unit 13 (in the step S7). Note that, even if the final operation result is obtained as the processing state after completion of the FEC processing ("YES" of the step S4), but if no RTP packet is lost among the RTP packets corresponding to the FEC packet ("NO" of the step S5), the computer device 40 also deletes the processing state from the state memory 22 and terminates the FEC processing by using the function of the improving quality unit 13 in the step S7.

Instead, if the FEC processing of the targeted packets is not completed due to switching of play target streams ("NO" of the step S4), the computer device 40 discontinues the FEC processing (in the step S8). Then, the computer device 40 returns to the step S1 in order that the improving quality unit 13 can perform the FEC processing for a new targeted FEC packet and new targeted RTP packets.

Note that the above procedure may further include a step of referring to the processing state stored in the state memory 22 to check whether or not the FEC processing for the FEC packet and RTP packets indicated by the operation controller 30 is halt. After the correspondences between the FEC packet and the RTP packets are stored in the correspondence memory 21 in the step S1, the improving quality unit 13 starts the FEC processing in reference to the correspondences stored in the correspondence memory 21 (in the step S2) if the FEC processing for the FEC packet and RTP packets indicated by the operation controller 30 is not halt. On the other hand, if the FEC processing is halt, the improving quality unit 13 resumes the FEC processing using the targeted FEC packet and RTP packets buffered in the RTP packet buffer 12 and identified from the RTP packet identification information included in the FEC packet, in reference to the processing state stored in the state memory 22 and the correspondences stored in the correspondence memory 21 (in the step S2).

According to the first embodiment, the computer device 40 stores the correspondences between the FEC packets and the RTP packets corresponding to the FEC packets. Also, the computer device 40 controls the FEC processing to be performed only for the packets to be played by referring to the stored correspondences. The computer device 40 can minimize increase of the amount of processing for packets that are expected to be candidates for play. Moreover, the computer device 40 can prevent from generating a further delay time after packet switching without degradation of playing quality.

(Description of the Second Embodiment)

Figure 6:
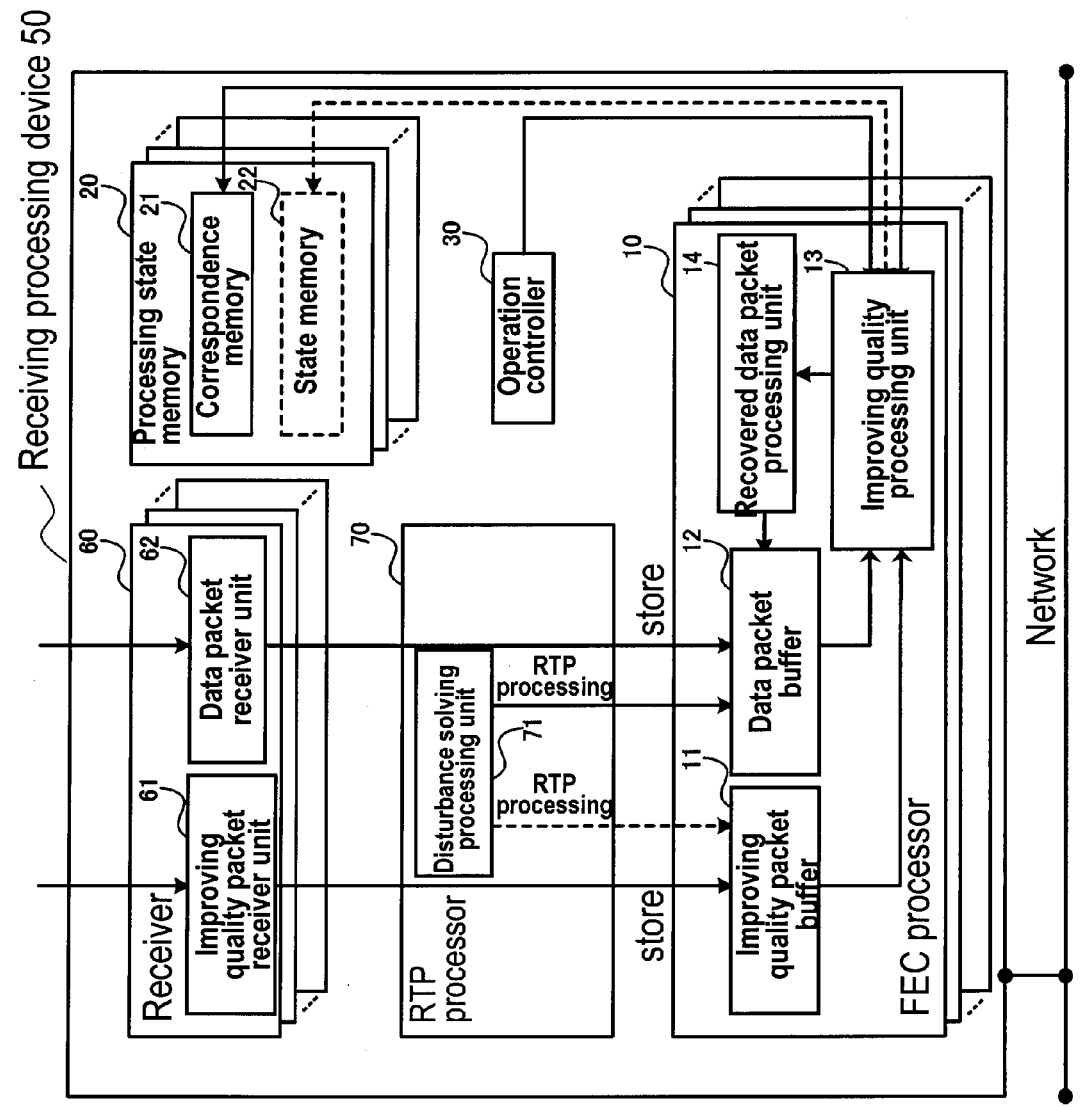
FIG. 6 is a block diagram illustrating a functional configuration of the receiving processing device according to a second embodiment.

FIG. 6 is a diagram illustrating a functional configuration of a receiving processing device 50. The control unit 51 of FIG. 1 includes a receiver 60, an RTP processor 70 and an FEC processor 10. Functions of the receiver 60 are implemented by the communication I/F 54 of FIG. 1. Functions of the RTP processor 70 are implemented through execution of the programs by the control unit 51 of FIG. 1. Functions of the processing state memory 20 are implemented by the main memory 52 of FIG. 1. Functions of the FEC processor 10 and an operation controller 30 are implemented through execution of the programs by the control unit 51 of FIG. 1. Here, the same elements as those in the first embodiment will be assigned the same reference signs and the description thereof is omitted.

The receiver 60 includes an improving quality packet receiver unit 61 and a data packet receiver unit 62. The improving quality packet receiver unit 61 receives improving quality packets (FEC packets) through the network NT1 from the transmitter device 100. The FEC packets each include a sequence number indicating which number in the data sequence is assigned to the FEC packet, redundant data to recover a lost data packet (a data packet is called an RTP packet), and RTP packet identification information to identify the RTP packets used to generate the redundant data. The redundant data is data generated by the transmitter device 100 through an XOR (exclusive logical OR) operation, as a predetermined operation, using multiple RTP packets associated with the FEC packet in advance. The RTP packet identification information may be, for example, sequence numbers assigned to the RTP packets, or calculated values resulting from an operation performed in advance in a predetermined way (re-configurable way) using the sequence numbers. The correspondences between the RTP packets and the FEC packet are specified according to the RTP packet identification information. The data packet receiver unit 62 receives the RTP packets from the transmitter device 100 through the network NT1. The RTP packets each include, for example, media data representing a video, sound and the like, a sequence number, a timestamp.

The RTP processor 70 includes a disturbance solving processing unit 71, whereas the FEC processor 10 includes a FEC packet buffer 11, an RTP packet buffer 12, an improving quality unit 13, and a recovered data packet processing unit 14. The FEC packet buffer 11 buffers (stores) FEC packets received by the improving quality packet receiver unit 61. The RTP packet buffer 12 buffers RTP packets received by the data packet receiver unit 62. The disturbance solving processing unit 71 performs RTP processing to solve a disturbance (especially, a wrong order in a data sequence or fluctuations of transmission intervals) in the RTP packets received by the data packet receiver unit 62. To be more precise, the disturbance solving processing unit 71 appropriately rearranges the RTP packets, received by the data packet receiver unit 62, in ascending order of the sequence numbers in the RTP packet buffer 12, and waits for a delayed RTP packet yet to be received due to an occurrence of jitter, for example. In addition, the disturbance solving processing unit 71 may perform the RTP processing to solve a disturbance in the FEC packets, received by the improving quality packet receiver unit 61, in the FEC packet buffer 11.

The operation controller 30 controls the FEC processing by referring to the correspondences stored in the correspondence memory 21 so that the FEC processing can be performed only for a stream targeted by an instruction given through user selection or the like, from among multiple received streams. For example, the operation controller 30 may control the FEC processing so that the improving quality processing 13 can perform the FEC processing only for a preset stream from among the multiple streams, or that the improving quality processing 13 can perform the FEC processing only for a stream selected by a user as a play target stream from multiple streams. Moreover, when a stream during play is switched to another stream, the operation controller 30 may control the FEC processing in such a manner as to start the FEC processing for the packets for the switched-to stream while discontinuing the FEC processing on the targeted packet for the stream during play.

Figure 7:
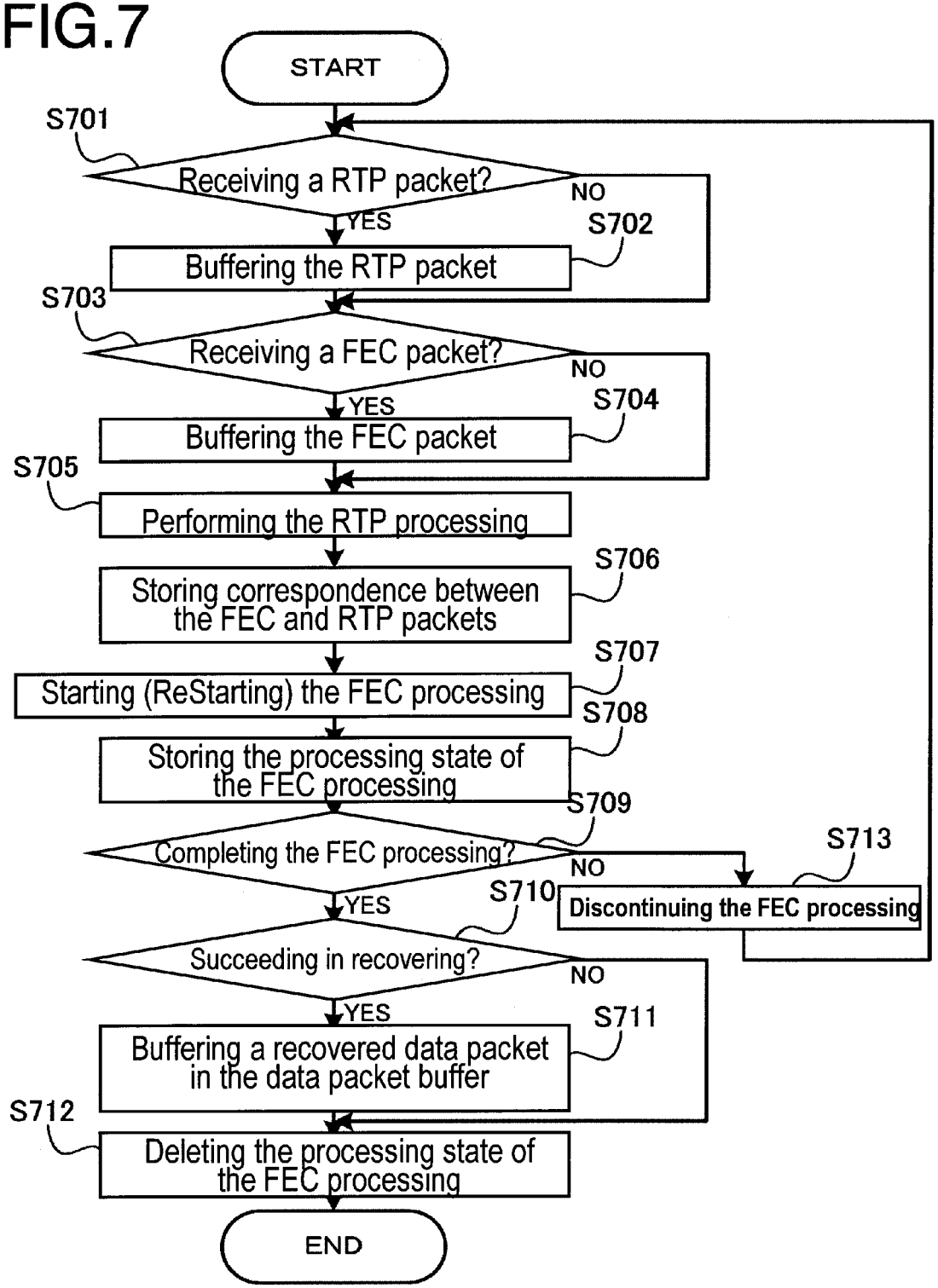
FIG. 7 is a flow chart explaining operation of the receiving processing device.

Next, a procedure of reception processing performed by the receiving processing device 50 according to the second embodiment will be described with reference to FIG. 7. When receiving an RTP packet by using the function of the data packet receiver unit 62 ("YES" of the step S701), the receiving processing device 50 buffers the RTP packet in the RTP packet buffer 12 (in the step S702). Meanwhile, when receiving an FEC packet by using the function of the improving quality packet receiver unit 61 ("YES" of the step S703), the receiving processing device 50 buffers the FEC packet in the FEC packet buffer 11 (in the step S704). In addition, the receiving processing device 50 performs the RTP processing to solve a disturbance (especially, a wrong order in a data sequence or fluctuations of transmission intervals) in the RTP packets in the RTP packet buffer 12 (and the FEC packet buffer 11) by using the function of the disturbance solving processing unit 71 (in the step S705).

Moreover, the receiving processing device 50 detects whether or not a new FEC packet is buffered in the FEC packet buffer 11. The receiving processing device 50 also detects whether or not a new RTP packet is buffered in the RTP packet buffer 12, by using the function of the improving quality unit 13. Then, the receiving processing device 50 uses the function of the improving quality unit 13 to cause the correspondence memory 21 to store the correspondence between the FEC packet buffered in the FEC packet buffer 11 and the RTP packet buffered in the RTP packet buffer 12 from among the RTP packets corresponding to the FEC packet (in the step S706).

The receiving processing device 50 refers to the correspondence stored in the correspondence memory 21 in the step S706, and causes the improving quality unit 13 to start the FEC processing by using the FEC packet and RTP packets targeted by an instruction given by the operation controller 30 (in the step S707). In the FEC processing, as described above, the receiving processing device 50 calculates the XOR of the FEC packet and one of RTP packets corresponding to the FEC packet and then repeats the operation of calculating the XOR of the immediately preceding operation result and another one of the RTP packets yet to be used in the operation. Upon completion of all the XOR operations using all the targeted RTP packets, the receiving processing device 50 causes the state memory 22 to store the processing state of the FEC processing (in the step S708). If the final operation result is obtained as the processing state after completion of the FEC processing ("YES" of the step S709), and if a lost packet is obtained as the processing state ("YES" of the step S710), the receiving processing device 50 buffers the obtained packet in the RTP packet buffer 12 by using the function of the recovered data packet processing unit 14 (in the step S711). As a result, the recovered RTP packet is buffered in the RTP packet buffer 12. In addition, the receiving processing device 50 deletes the processing state from the state memory 22 and terminates the FEC processing by using the function of the improving quality unit 13 (in the step S712). Note that, even if the final operation result is obtained as the processing state after completion of the FEC processing ("YES" of the step S709), but if no RTP packet is lost among the RTP packets corresponding to the FEC packet ("NO" in the step S710), the receiving processing device 50 also deletes the processing state from the state memory 22 and terminates the FEC processing by using the function of the improving quality unit 13 (in the step S712).

Instead, if the FEC processing of the targeted packets is not completed due to switching of play target streams ("NO" of the step S709), the receiving processing device 50 halts the FEC processing (in the step S713). Then, the receiving processing device 50 returns to the step S701 in order that the improving quality unit 13 can perform the FEC processing on a new targeted FEC packet and new targeted RTP packets.

Note that the aforementioned procedure may additionally include a step of referring to the processing state of the state memory 22 to check whether or not the FEC processing for the FEC packet and RTP packets targeted by an instruction given by the operation controller 30 is discontinued. After the correspondences between the FEC packet and the RTP packets are stored in the correspondence memory 21 in the step S706, the improving quality unit 13 starts the FEC processing in reference to the correspondences stored in the correspondence memory 21 (in the step S707) if the FEC processing for the FEC packet and RTP packets targeted by the instruction given by the operation controller 30 is not discontinued. On the other hand, if the FEC processing is discontinued, the improving quality unit 13 resumes the FEC processing using the targeted FEC packet and RTP packets buffered in the RTP packet buffer 12 and identified from the RTP packet identification information included in the FEC packet, in reference to the processing state stored in the state memory 22 and the correspondences stored in the correspondence memory 21 (in the step S707).

As described above, the correspondences between the FEC packets and the RTP packets corresponding to the FEC packets are stored, and the FEC processing is controlled to be performed only for the targeted packets needed for play by referring to the stored correspondences. Such FEC processing control prevents deterioration of play quality and new generation of delay time after packet switching while minimizing an increase in the amount of processing for packets that are expected to be candidates for play. Moreover, this enables parallel execution of the FEC processing and the RTP processing to solve a disturbance such as a wrong order in the data sequence or fluctuations of transmission intervals, and also enables the FEC processing for multiple FEC packets to be executed in such a parallel manner that the FEC processing for an FEC packet can be started without waiting for the completion of the FEC processing for a preceding FEC packet.

(Description of the Third Embodiment)

Figure 8:
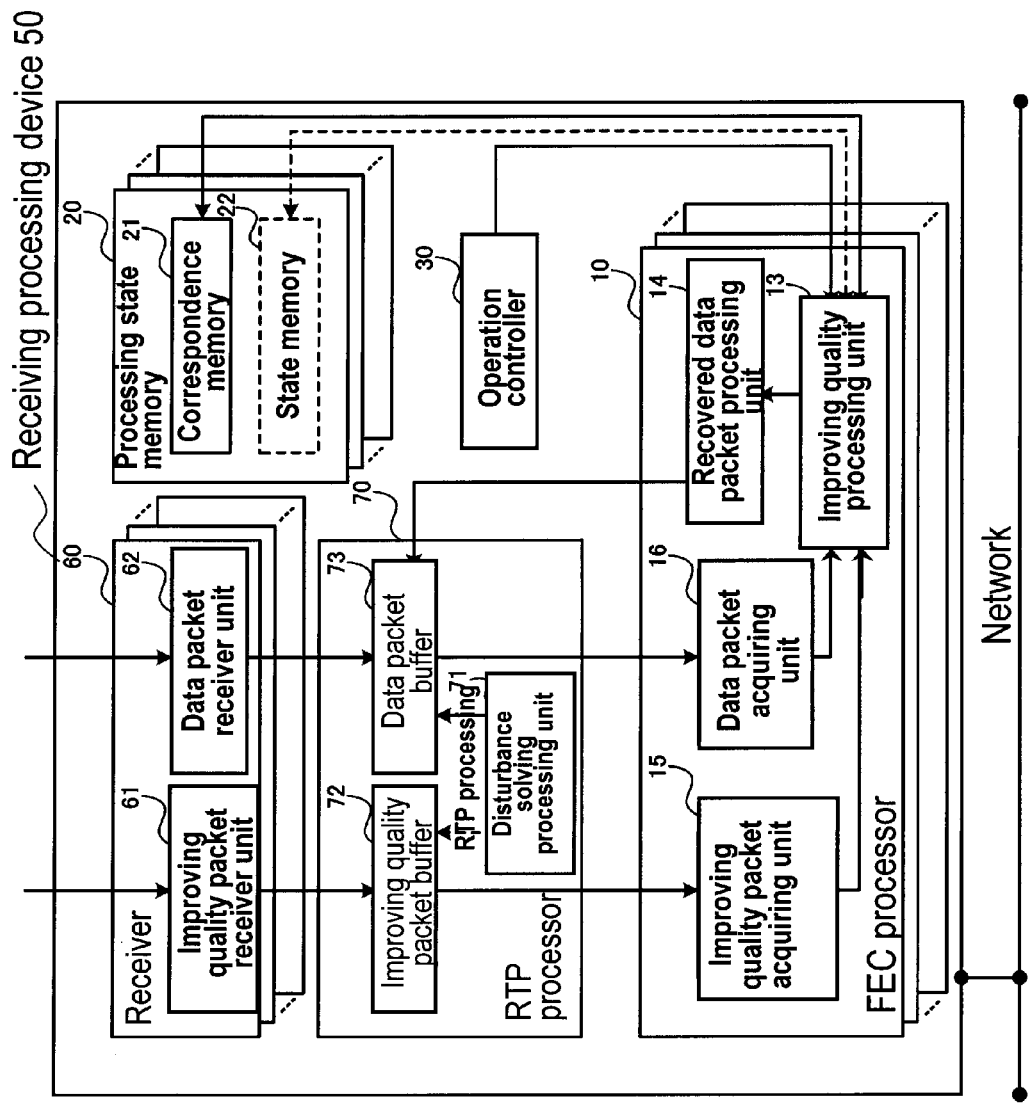
FIG. 8 is a block diagram illustrating a functional configuration of the receiving processing device according to a third embodiment.

FIG. 8 is a diagram illustrating a functional configuration of the receiving processing device 50. The control unit 51 includes a receiver 60, an RTP processor 70, and an FEC processor 10. Functions of the receiver 60 are implemented by the communication I/F 54. Functions of the RTP processor 70 are implemented through execution of the programs by the control unit 51, and also by the main memory 52. Functions of a processing state memory 20 are implemented by the main memory 52. Functions of the FEC processor 10 and an operation controller 30 are implemented through execution of the programs by the control unit 51. Here, the same elements as those in the first and second embodiments will be assigned the same reference signs and the description thereof is omitted.

The receiver 60 includes an improving quality packet receiver unit 61 and a data packet receiver unit 62. The improving quality packet receiver unit 61 receives improving quality packets (FEC packets) through the network NT1 from the transmitter device 100. The FEC packets each include a sequence number indicating which number in the data sequence is assigned to the FEC packet, redundant data to recover a lost data packet (a data packet is called as an RTP packet), and RTP packet identification information to identify the RTP packets used to generate the redundant data. The redundant data is data generated by the transmitter device 100 through an XOR (exclusive logical OR) operation, as a predetermined operation, using multiple RTP packets associated with the FEC packet in advance. The RTP packet identification information may be, for example, sequence numbers assigned to the RTP packet, or calculated values resulting from an operation performed in advance in a predetermined way (re-configurable way) using the sequence numbers. The correspondences between the RTP packets and the FEC packet are specified according to the RTP packet identification information. The data packet receiver unit 62 receives the RTP packets from the transmitter device 100 through the network NT1. The RTP packets each include, for example, media data representing a video, sound and the like, a sequence number, a timestamp.

The RTP processor 70 includes a disturbance solving processing unit 71, an improving quality packet buffer 72 and a data packet buffer 73. The improving quality packet buffer 72 buffers (stores) FEC packets received by the improving quality packet receiver unit 61. The data packet buffer 73 buffers RTP packets received by the data packet receiver unit 62. The disturbance solving processing unit 71 performs RTP processing to solve a disturbance (especially, a wrong order in a data sequence or fluctuations of transmission intervals) in the RTP packets received by the data packet receiver unit 62. To be more precise, the disturbance solving processing unit 71 appropriately rearranges the RTP packets, received by the data packet receiver unit 62, in ascending order of the sequence numbers in the data packet buffer 73, and waits for a delayed RTP packet yet to be received due to an occurrence of jitter, for example. In addition, the disturbance solving processing unit 71 may perform the RTP processing to solve a disturbance in the FEC packets, received by the improving quality packet receiver unit 61, in the improving quality packet buffer 72.

The FEC processor 10 includes an improving quality packet acquiring unit 15, a data packet acquiring unit 16, an improving quality unit 13 and a recovered data packet processing unit 14. The improving quality packet acquiring unit 15 acquires an FEC packet by reading the FEC packet from the improving quality packet buffer 72. The data packet acquiring unit 16 acquires an RTP packet by reading the RTP packet from the data packet buffer 73. The improving quality unit 13 performs FEC processing to recover a lost RTP packet by performing an operation in a predetermined method using an FEC packet acquired by the improving quality packet acquiring unit 15 and RTP packets corresponding to the FEC packet and acquired by the data packet acquiring unit 16. More specifically, for example, the improving quality unit 13 calculates, as a predetermined operation, the XOR of the redundant data included in the FEC packet and one of the RTP packets corresponding to the FEC packet, and thereby obtains an in-progress operation result (called an operation result). Then, the improving quality unit 13 calculates the XOR of the operation result and another one of the RTP packets corresponding to the FET packet, and obtains an operation result. When there are three or more RTP packets corresponding to a single FEC packet, the improving quality unit 13 repeatedly calculates the XOR of the immediately preceding operation result and one of the RTP packets yet to be used in the operation. In this way, the improving quality unit 13 calculates the XOR for each of the RTP packets corresponding to an FEC packet, and obtains the operation result. Thus, when any of the RTP packets corresponding to the FEC packet is lost, the improving quality unit 13 obtains the lost RTP packet as a final operation result. In other words, the lost RTP packet is recovered. On the other hand, when no RTP packet is lost from among the RTP packets corresponding to the FEC packet, the improving quality unit 13 can invalidate the final operation result.

In addition, in the third embodiment, the improving quality unit 13 detects whether or not a new FEC packet is buffered in the improving quality packet buffer 72, and also detects whether or not a new RTP packet is buffered in the data packet buffer 73. Then, the improving quality unit 13 causes the correspondence memory 21 to store the correspondence between the FEC packet buffered in the improving quality packet buffer 72 and the RTP packet buffered in the data packet buffer 73 from among the RTP packets corresponding to the FEC packet. Note that, the RTP packets corresponding to the FEC packet can be identified by using the aforementioned RTP packet identification information. To express the correspondences, the sequence number of the FEC packet and the sequence number of the RTP packet corresponding to the FEC packet may be expressed in the form of matrix, or may be liked with each other in the form of graph, for example.

The improving quality unit 13 refers to the correspondences stored in the correspondence memory 21 when starting the FEC processing, and performs the FEC processing by using the FEC packet targeted for the processing, and the RTP packet yet to be used by the FEC processor 10 in the above mentioned XOR operation for the FEC packet, from among the RTP packets corresponding to the FEC packet and being buffered in the data packet buffer 73. Upon completion of the XOR operation using the RTP packet, the improving quality unit 13 causes the state memory 22 to store the sequence number of the FEC packet targeted for the processing, the sequence number assigned to the RTP packet used in the XOR operation, and a processing state indicating the operation result. In addition, upon completion of the FEC processing in which any one of the RTP packets corresponding to the FEC packet is found lost, the improving quality unit 13 obtains, as the processing state, the RTP packet that is the final operation result, outputs the recovered data packet processing unit 14, and deletes the processing state of the FEC processing for the FEC packet from the state memory 22, and thus terminates the FEC processing. On the other hand, upon completion of the FEC processing in which none of the RTP packets corresponding to the FEC packet is found lost, the improving quality unit 13 invalidates the processing state of the FEC processing for the FEC packet by deleting the processing state from the state memory 22, and terminates the FEC processing.

The recovered data packet processing unit 14 outputs the RTP packet which is recovered and outputted by the improving quality unit 13, to the data packet buffer 73. At this time, the recovered data packet processing unit 14 causes the data packet buffer 73 to buffer the RTP packet by inserting the RTP packet so that the aforementioned sequence numbers can be arranged in the ascending order in the data packet buffer 73. Note that, the RTP packets buffered in the data packet buffer 73 are sequentially passed to a certain application program, and a function of the application program performs play using the RTP packets.

The operation controller 30 controls the FEC processing by referring to the correspondences stored in the correspondence memory 21 so that the FEC processing can be performed only for a stream targeted by an instruction given through user selection or the like, from among multiple received streams. For example, the operation controller 30 may control the FEC processing so that the improving quality processing 13 can perform the FEC processing only for a preset stream from among the multiple streams, or that the improving quality processing 13 can perform the FEC processing only for a stream selected by a user as a play target stream from multiple streams. Moreover, when a stream during play is switched to another stream, the operation controller 30 may control the FEC processing in such a manner as to start the FEC processing for the packets for the switched-to stream while discontinuing the FEC processing on the targeted packet for the stream during play.

Figure 9:
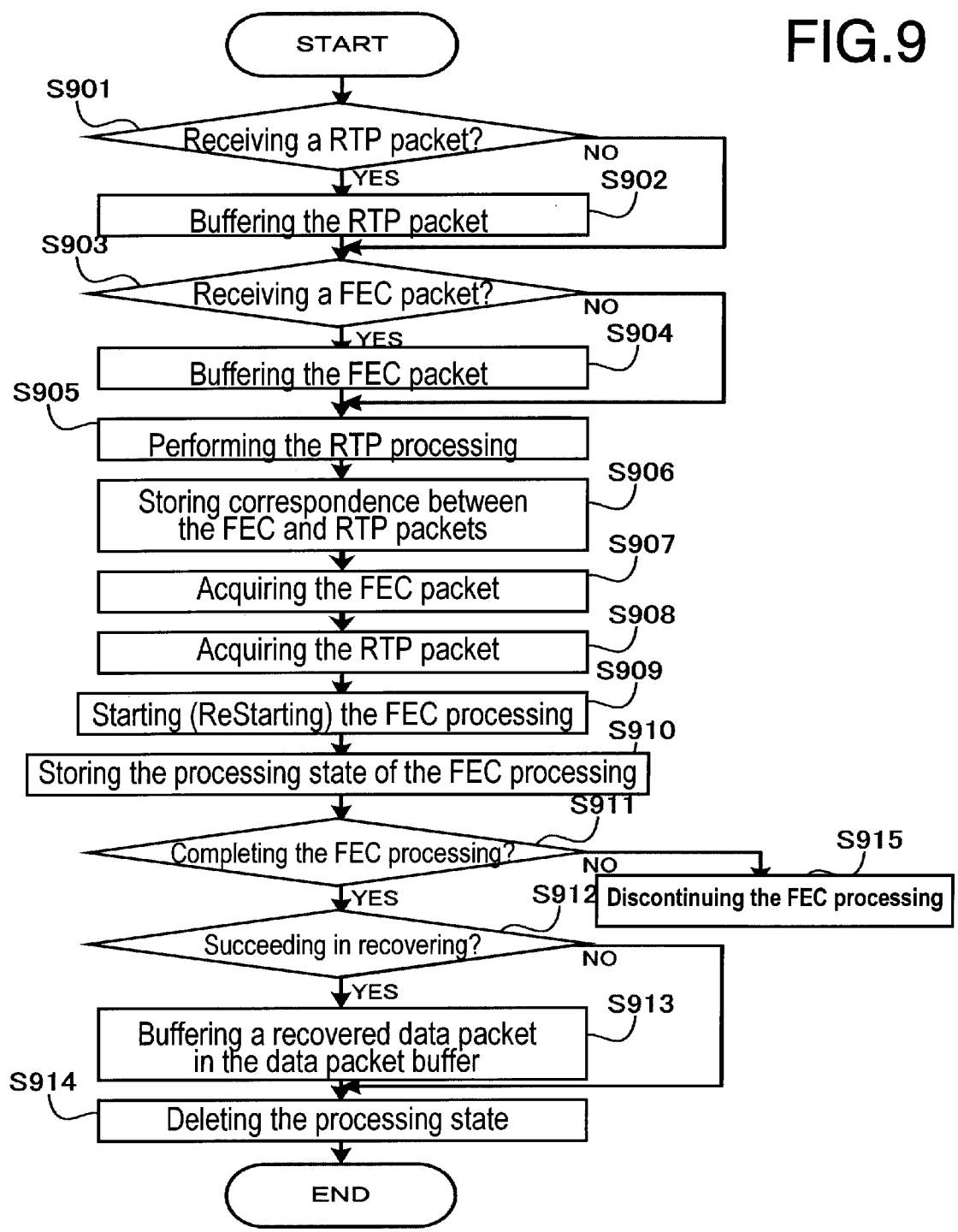
FIG. 9 is a flow chart explaining operation of the receiving processing device.

Next, a procedure of reception processing performed by the receiving processing device 50 according to the third embodiment will be described with reference to FIG. 9. When receiving an RTP packet by using the function of the data packet receiver unit 62 ("YES" in the step S901), the receiving processing device 50 buffers the RTP packet in the data packet buffer 73 (in the step S902). Meanwhile, when receiving an FEC packet by using the function of the improving quality packet receiver unit 61 ("YES" in the step S903), the receiving processing device 50 buffers the FEC packet in the improving quality packet buffer 72 (in the step S904). In addition, the receiving processing device 50 performs the RTP processing to solve a disturbance (especially, a wrong order in a data sequence or fluctuations of transmission intervals) in the RTP packets in the data packet buffer 73 (and the improving quality packet buffer 72) by using the function of the disturbance solving processing unit 71 (in the step S905).

Moreover, the receiving processing device 50 detects whether or not a new FEC packet is buffered in the improving quality packet buffer 72 and also detects whether or not a new RTP packet is buffered in the data packet buffer 73, by using the function of the improving quality unit 13. Then, the receiving processing device 50 uses the function of the improving quality unit 13 to cause the correspondence memory 21 to store the correspondence between the FEC packet buffered in the improving quality packet buffer 72 and the RTP packet buffered in the data packet buffer 73 from among the RTP packets corresponding to the FEC packet (in the step S906).

The receiving processing device 50 acquires the FET packet targeted for the processing by reading the FET packet from the improving quality packet buffer 72 with use of the function of the improving quality packet acquiring unit 15 (in the step S907). The receiving processing device 50 refers to the correspondences stored in the correspondence memory 21, and acquires, by using the function of the data packet acquiring unit 16, the RTP packets buffered in the data packet buffer 73 (in the step S908) from among the RTP packets specified by the RTP packet identification information included in the FEC packet acquired in the step S907. Here, the number of RTP packets thus acquired may be one or more.

The receiving processing device 50 refers to the correspondence stored in the correspondence memory 21 in the step S906, and causes the improving quality unit 13 to start the FEC processing by using the FEC packet and RTP packets targeted by an instruction given by the operation controller 30 (in the step S909). In the FEC processing, as described above, the receiving processing device 50 calculates the XOR of the FEC packet and one of RTP packets corresponding to the FEC packet and then repeats the operation of calculating the XOR of the immediately preceding operation result and another one of the RTP packets yet to be used in the operation. Upon completion of all the XOR operations using all the targeted RTP packets, the receiving processing device 50 causes the state memory 22 to store the processing state of the FEC processing (in the step S910). If the final operation result is obtained as the processing state after completion of the FEC processing ("YES" of the step S911), and if a lost packet is obtained as the processing state ("YES" of the step S912), the receiving processing device 50 buffers the obtained packet in the data packet buffer 73 by using the function of the recovered data packet processing unit 14 (in the step S913). As a result, the recovered RTP packet is buffered in the data packet buffer 73. In addition, the receiving processing device 50 deletes the processing state from the state memory 22 and terminates the FEC processing by using the function of the improving quality unit 13 (in the step S914). Note that, even if the final operation result is obtained as the processing state after completion of the FEC processing ("YES" of the step S911), but if no RTP packet is lost among the RTP packets corresponding to the FEC packet ("NO" of the step S912), the receiving processing device 50 also deletes the processing state from the state memory 22 and terminates the FEC processing by using the function of the improving quality unit 13 (in the step S914).

Instead, if the FEC processing of the targeted packets is not completed due to switching of play target streams ("NO" of the step S911), the receiving processing device 50 halts the FEC processing (in the step S915). Then, the receiving processing device 50 returns to the step S901 in order that the improving quality unit 13 can perform the FEC processing on a new targeted FEC packet and new targeted RTP packets.

Note that the aforementioned procedure may additionally include a step of referring to the processing state of the state memory 22 to check whether or not the FEC processing for the FEC packet and RTP packets targeted by an instruction given by the operation controller 30 is discontinued. After the correspondences between the FEC packet and the RTP packets are stored in the correspondence memory 21 in the step S906, the improving quality unit 13 starts the FEC processing in reference to the correspondences stored in the correspondence memory 21 (in the step S907) if the FEC processing for the FEC packet and RTP packets targeted by the instruction given by the operation controller 30 is not discontinued. On the other hand, if the FEC processing is discontinued, the improving quality unit 13 resumes the FEC processing using the targeted FEC packet and RTP packets buffered in the data packet buffer 73 and identified from the RTP packet identification information included in the FEC packet, in reference to the processing state stored in the state memory 22 and the correspondences stored in the correspondence memory 21 (in the step S907).

As described above, the correspondences between the FEC packets and the RTP packets corresponding to the FEC packets are stored, and the FEC processing is controlled to be performed only for the targeted packets needed for play by referring to the stored correspondences. Such FEC processing control prevents deterioration of play quality and new generation of delay time after packet switching while minimizing an increase in the amount of processing for packets to be used for play. Moreover, this enables parallel execution of the FEC processing and the RTP processing to solve a disturbance such as a wrong order in a data sequence or fluctuations of transmission intervals, and also enables the FEC processing for multiple FEC packets to be executed in such a parallel manner that the FEC processing for an FEC packet can be started without waiting for the completion of the FEC processing for the preceding FEC packet.

While certain embodiments have been described, these embodiments have been presented by way of example only, and are not intended to limit the scope of the inventions. Indeed, the novel systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

Figure 10:
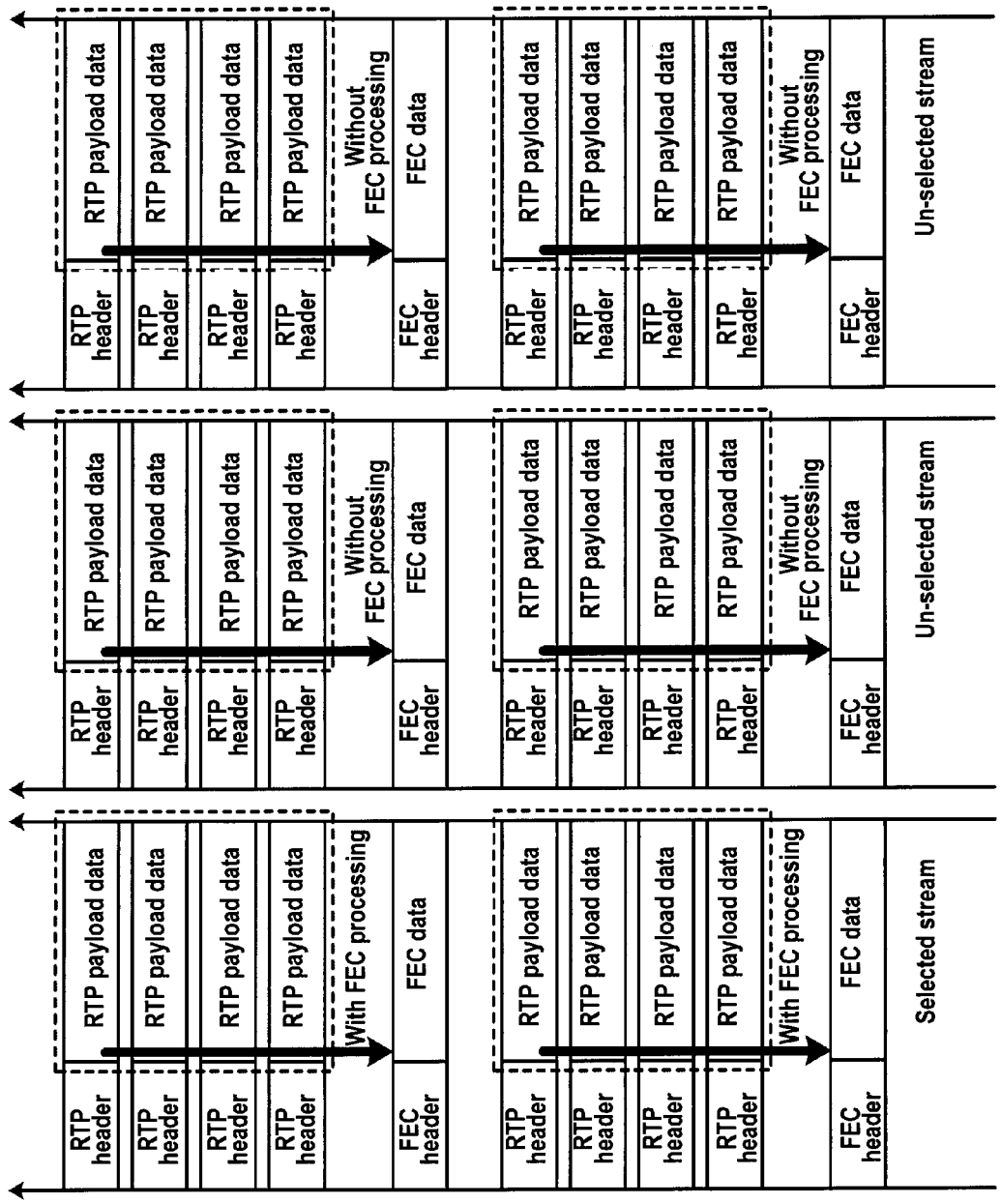
FIG. 10 shows an example of transmitting plural streams individually.
Figure 11:
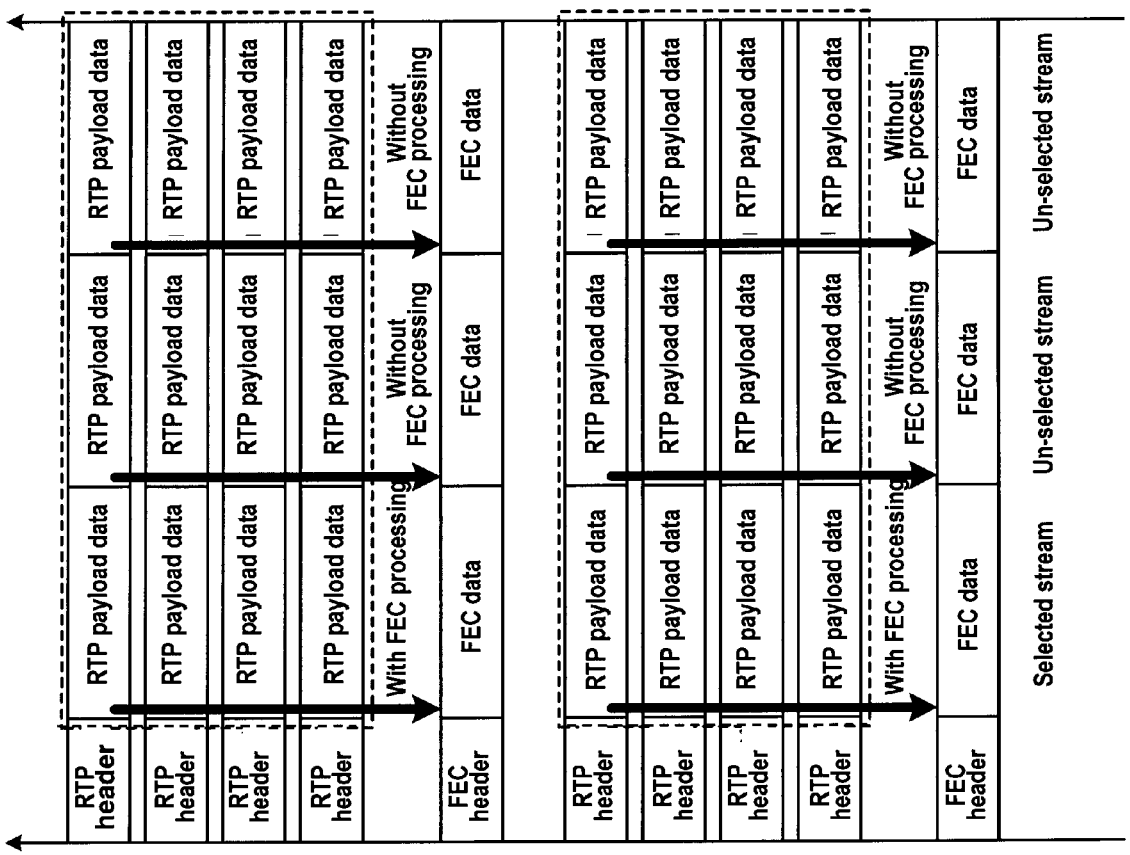
FIG. 11 shows an example of transmitting plural streams integrally.

The above embodiments are applicable to both cases where multiple streams are transmitted separately from each other as shown in FIG. 10, and where multiple streams are transmitted integrally with each other as shown in FIG. 11. In addition, the operation controller 30 has been described above with reference to the embodiments in which the control is made so that streams are switched by a user like channel switching. However, besides different channels as in IP broadcasting, multiple streams may include streams with different resolutions as in progressive coding, or may be streams of images obtained at different observation points or coverage angles as in multiple-perspective video, for example.

The above embodiments may be configured to provide various programs executed on the computer device 40 in such a manner that the programs are stored in a computer connected to a network such as the Internet, and downloaded through the network. Instead, the programs may provided as computer program products by being stored as files in installable or executable format in computer-readable storage media such as a CD-ROM, a flexible disk (FD), a CD-R, and a DVD (Digital Versatile Disk).

Figure 2B:
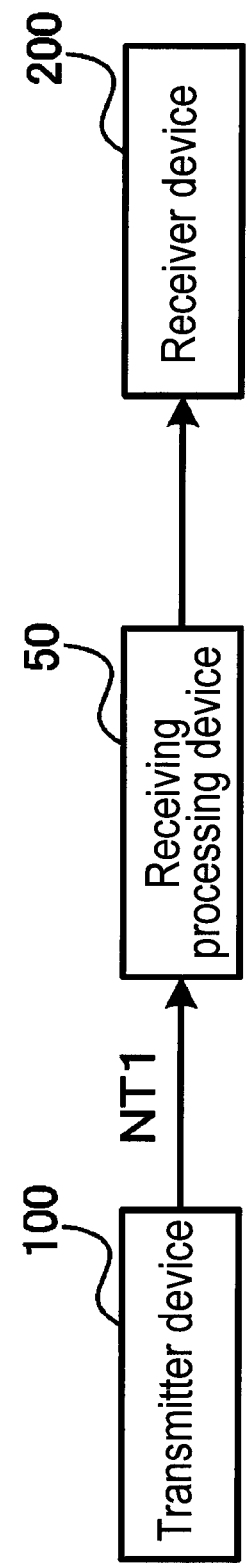
FIG. 2B is a diagram showing another example of transmitting and receiving.

In the above embodiments, the computer device 40 may send a receiver device 200 RTP packets and FEC packets, which are received from the transmitter device 100 and are processed in reception processing, as shown in FIG. 2B. The computer device 40 and the receiver device 200 may be connected to each other through a network similar to the aforementioned network NT1, or through either of a network different from the network NT1 and a dedicated line.

In the above embodiments, the XOR operation is performed as the operation used to generate redundant data and the operation of executing the FEC processing. Instead of the XOR operation, however, a different operation may be employed. In the above embodiments, the correspondence memory 21 and the state memory 22 are configured as different memorys, but may be configured as a single unit. More specifically, for every session of the FEC processing, the computer device 40 may store the FEC packet buffered in the FEC packet buffer 11, the RTP packets buffered in the RTP packet buffer 12 and corresponding to the FEC packet, and the processing state of the FEC processing using the FEC packet and the RTP packets, in a single table or as a data or file of a graph including these items.

Furthermore, the correspondences between the FEC packet and the RTP packets corresponding to the FEC packet may be expressed in a form other than the aforementioned example. For example, the correspondences may be expressed in any form other than the form using the sequence numbers and the form of matrix or graph.

What is claimed is:
1. A computer device comprising:
a data packet buffer to store received data packets of a plurality of data streams;
an improving quality packet buffer to store an improving quality packet, the improving quality packet including redundant data to recover a lost data packet of a first one of the data streams and identification information to identify one or more of the received data packets used for generating the redundant data;
an improving quality processing unit to detect a data packet of the received data packets stored in the data packet buffer, the detected data packet corresponding to the improving quality packet and being identified based on the identification information;
a correspondence memory to store a correspondence between the improving quality packet and the detected data packet;
an operation controller to issue, when the first one of the data streams is selected, an instruction of improving quality processing to recover the lost data packet; and
a recovered data packet processing unit to process the recovered data packet;
wherein the improving quality processing unit performs, when receiving the instruction from the operation controller, the improving quality processing to recover the lost data packet, using the redundant data in the improving quality packet and the data packet identified by the correspondence.

2. A receiving device comprising:
a data packet receiver unit to receive data packets of a plurality of data streams;
a data packet buffer to store the received data packets;
an improving quality packet receiver unit to receive an improving quality packet, the improving quality packet including redundant data to recover a lost data packet of a first one of the data streams and identification information to identify one or more of the received data packets used for generating the redundant data;
an improving quality packet buffer to store the improving quality packet;
a disturbance solving processing unit to solve a disturbance of the received data packets;
an improving quality processing unit to detect a data packet of the received data packets stored in the data packet buffer, the detected data packet corresponding to the improving quality packet and being identified based on the identification information;
a correspondence memory to store a correspondence between the improving quality packet and the detected data packet;
an operation controller to issue, when the first one of the data streams is selected, an instruction of improving quality processing to recover the lost data packet; and
a recovered data packet processing unit to process, if the lost data packet is recovered, the recovered data packet;
wherein the improving quality processing unit performs, when receiving the instruction from the operation controller, the improving quality processing to recover the lost data packet, using the redundant data in the improving quality packet and the data packet identified by the correspondence.

3. The device of claim 2, further comprising a state memory to store a processing state for every session of the improving quality processing.

4. The device of claim 3, wherein if the device selects a second one of the data streams, the operation controller controls the improving quality processing unit to discontinue the improving quality processing for the first selected data stream, and to store the processing state of the improving quality processing into the state memory.

5. The device of claim 4, wherein if the lost data packet in the first selected data stream is recovered by the improving quality processing, the improving quality processing unit deletes the processing state of the improving quality processing from the state memory.

6. The device of claim 2, further comprising:
an improving quality packet acquiring unit to acquire the improving quality packet from the improving quality packet buffer; and
a data packet acquiring unit to acquire the data packet from the data packet buffer,
wherein the correspondence memory stores a correspondence between the improving quality packet acquired by the improving quality packet acquiring unit, and the data packet identified according to the identification information and acquired by the data packet acquiring unit.

7. A receiving method comprising:
receiving data packets of a plurality of data streams by a data packet receiver unit;
storing the received data packets into a data packet buffer;
receiving an improving quality packet by an improving quality packet receiver unit, the improving quality packet including redundant data to recover a lost data packet of a first one of the data streams and identification information to identify one or more of the received data packets used for generating the redundant data;
storing the improving quality packet into an improving quality packet buffer;
detecting a data packet of the received data packets stored in the data packet buffer, the detected data packet corresponding to the improving quality packet and being identified based on the identification information;
storing, in a memory, a correspondence between the improving quality packet and the detected data packet;
issuing by an operation controller, when the first one of the data streams is selected, an instruction of improving quality processing to recover the lost data packet;
performing, by an improving quality processing unit when receiving the instruction from the operation controller, the improving quality processing to recover the lost data packet, using the redundant data in the improving quality packet and the data packet identified by the correspondence; and
storing the recovered data packet into the data packet buffer by a recovered data packet processing unit.

8. A non-transitory computer-readable storage medium storing instructions, executable by a processor, to cause a device to perform a receiving processing method, the method comprising:
receiving data packets of a plurality of data streams by a data packet receiver unit;
storing the received data packets into a data packet buffer;
receiving an improving quality packet by an improving quality packet receiver unit, the improving quality packet including redundant data to recover a lost data packet of a first one of the data streams and identification information to identify one or more of the received data packets used for generating the redundant data;
storing the improving quality packet into an improving quality packet buffer;
detecting a data packet of the received data packets stored in the data packet buffer, the detected data packet corresponding to the improving quality packet and being identified based on the identification information;
storing, in a memory, a correspondence between the improving quality packet and the detected data packet;
issuing by an operation controller, when the first one of the data streams is selected, an instruction of improving quality processing to recover the lost data packet;
performing, by an improving quality processing unit when receiving the instruction from the operation controller, the improving quality processing to recover the lost data packet, using the redundant data in the improving quality packet and the data packet identified by the correspondence; and
storing the recovered data packet into the data packet buffer by a recovered data packet processing unit.

9. A computing processing method, comprising:
storing received data packets of a plurality of data streams in a data packet buffer;
storing an improving quality packet in an improving quality packet buffer, the improving quality packet including redundant data to recover a lost data packet of a first one of the data streams and identification information to identify one or more of the received data packets used for generating the redundant data;
detecting, by an improving quality processing unit, a data packet of the received data packets stored in the data packet buffer, the detected data packet corresponding to the improving quality packet and being identified based on the identification information;
storing a correspondence between the improving quality packet and the detected data packet;
issuing by an operation controller, when the first one of the data streams is selected, an instruction of improving quality processing to recover the lost data packet;
performing, by an improving quality processing unit when receiving the instruction from the operation controller, the improving quality processing to recover the lost data packet, using the redundant data in the improving quality packet and the data packet identified by the correspondence; and
storing the recovered data packet in the data packet buffer by a recovered data packet processing unit.

10. A non-transitory computer-readable storage medium storing instructions, executable by a processor, to cause a device to perform a receiving processing method, the method comprising:
storing received data packets of a plurality of data streams in a data packet buffer;
storing an improving quality packet in an improving quality packet buffer, the improving quality packet including redundant data to recover a lost data packet of a first one of the data streams and identification information to identify one or more of the received data packets used for generating the redundant data;
detecting, by an improving quality processing unit, a data packet of the received data packets stored in the data packet buffer, the detected data packet corresponding to the improving quality packet and being identified based on the identification information;
storing, in a memory, a correspondence between the improving quality packet and the detected data packet;

issuing by an operation controller, when the first one of the data streams is selected, an instruction of improving quality processing to recover the lost data packet;

performing, by an improving quality processing unit when receiving the instruction from the operation controller, the improving quality processing to recover the lost data packet, using the redundant data in the improving quality packet and the data packet identified by the correspondence; and storing the recovered data packet in the data packet buffer by a recovered data packet processing unit.

* * * * *